No. 733,911. PATENTED JULY 14, 1903.
W. C. LAWSON.
HORSE COLLAR.
APPLICATION FILED APR. 16, 1902.
NO MODEL.
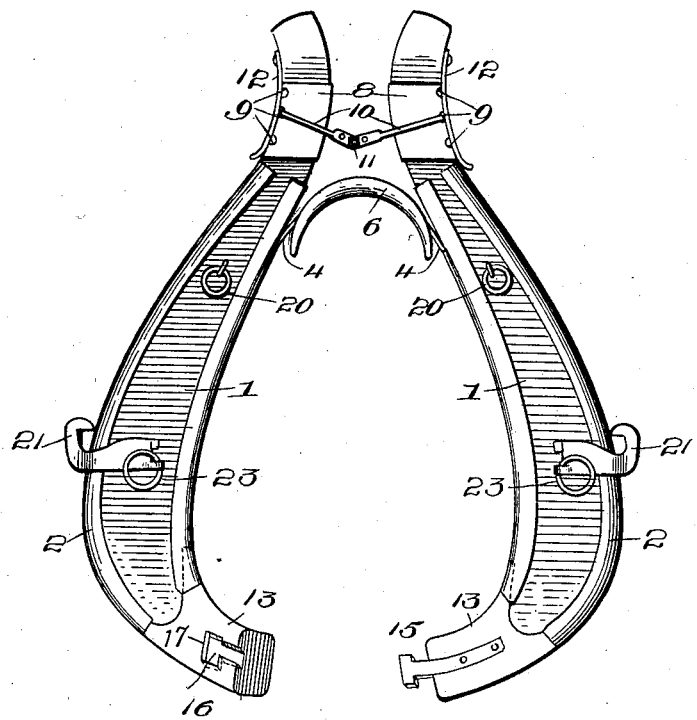
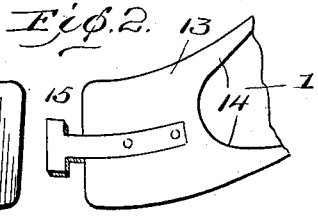
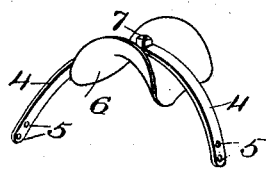 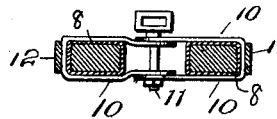 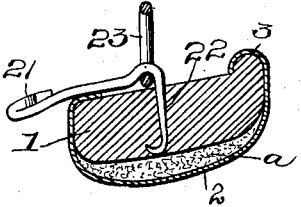
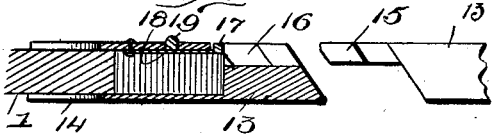
Witnesses:
J. M. Fowler
L. E. Wilson
Inventor:
Wm. C. Lawson No. 733,911.

Patented July 14, 1903.

UNITED STATES PATENT OFFICE.

WILLIAM C. LAWSON, OF RURAL RETREAT, VIRGINIA.

HORSE-COLLAR.

SPECIFICATION forming part of Letters Patent No. 733,911, dated July 14, 1903.

Application filed April 16, 1902. Serial No. 103,080. (No model.)

*To all whom it may concern:*

Be it known that I, WILLIAM C. LAWSON, a citizen of the United States, residing at Rural Retreat, in the county of Wythe and State of Virginia, have invented certain new and useful Improvements in Horse-Collars; and I do hereby declare the following to be a full, clear, and exact description of the invention, such as will enable others skilled in the art to which it appertains to make and use the same.

My invention relates to certain new and useful improvements in horse-collars, and has for its object to produce a collar which while possessing all of the advantages of both metallic and leather collars will dispense with the use of hames and will be comparatively cheap to manufacture.

A further object of my invention is to render such a collar adjustable, that a single collar may be adapted to fit the neck of a large or small horse, thereby obviating the necessity for manufacturing collars of several sizes.

A still further object of this invention is to combine with a spring-top connection of the collar members a lower locking connection dependent in its action upon the torsional and rolling actions of the spring connection, as well as its hinge-like action.

Finally my invention has for its object to provide for details of construction resulting in a cheap, durable, and efficient hameless collar which may be quickly attached and detached and when in position for use is locked against the possibility of accidental disengagement.

With the above and other objects in view my invention consists in the following features: collar sections or members of wood having their bearing-surfaces covered with felt or other suitable resilient material and provided with a leather or thin sheet-metal covering on said bearing-surfaces, with their front portions left free of such covering; collar sections or members of wood having their bearing-surfaces covered with felt or other suitable resilient material with a leather or other flexible covering and provided with forwardly-projecting rounded beads on their inner front edges; collar members connected at their upper parts by a spring forming a hinge-like connection adjustable with relation to said members, in combination with engaging means at the lower ends of said members; an adjustable spring connection for collar members, in combination with adjustable means connecting the collar members above the spring connection and engaging means at the lower ends of the collar members; a spring-top connection for members of a horse-collar, in combination with engaging means at the lower ends of the collar members dependent upon the torsional, rolling, and hinge-like actions of the spring connection for its operation.

The novel details of construction and combination of parts will be clearly described in the following specification and fully set forth in the claims.

Referring to the accompanying drawings, forming a part of this specification, and in which like characters of reference indicate same parts in the several views, Figure 1 is a front elevation of my improved horse-collar. Fig. 2 is an enlarged front elevation of the lower part thereof, showing the engaging means in detail. Fig. 3 is a perspective view of the connecting-spring with the neck-guard attached. Fig. 4 is a transverse section of one of the collar members. Fig. 5 is a central longitudinal section of the engaging means; and Fig. 6 is a plan view of the adjustable link connection, showing the collar members in section.

In the drawings, 1 and 1 represent the members of a horse-collar formed of wood (preferably oak) or other like material, having their rear or bearing surfaces covered with felt or other suitable material *a* and provided with the leather or thin sheet-metal covering 2, which is retained thereon by having its edges turned over and tacked onto the front surfaces of the members 1. The inner front edges of the members 1, with their leather or metal covering 2, are formed with a forwardly-projecting rounded bead 3. Near their upper ends the members 1 are connected by a strap-spring 4, which is adjustably secured thereto by means of screws passing through perforations 5 in the ends of said spring 4. Depending from the middle portion of the spring 4 is a metallic neck-guard 6, loosely mounted on a connecting rivet or bolt 7, so as to be free to have a partial pivotal movement thereon. Above the spring connection 4 the members 1 are provided with sheet-metal sleeves 8, having a series of depressions or notches 9 in their outer edges, into which fit the bends of a pair of U-shaped links 10, which have their ends flattened and perforated to receive a connecting-bolt 11, provided with a looped head on its rear end. The bolt 11 may be passed through any of the perforations in the links 10 to lengthen or shorten the distance between their bends, and so bring the top ends of the members 1 farther apart or closer together as the spring 4, with its neck-pad, is adjusted higher or lower on the members 1. To further adjust the distance between the upper ends of members 1, on the adjustment of spring 4 the notches 9 are located on an incline, so that a change of the links 10 from one notch to another will result in a change in such distance, the distance diminishing as the links are lowered. The links 10 are retained within the notches 9 in which they are placed by means of strap-springs 12, connected at their upper ends to the members 1 and extending down across all the notches and bearing with sufficient pressure to prevent accidental removal of the links 10, but permitting the intentional adjustment of said links from one notch to another.

At their lower ends the members 1 are provided with solid tips 13, (preferably of malleable-iron castings,) which have sockets 14, into which the ends of members 1 tightly fit and are secured thereto by spikes or screws. The two tips 13 are adapted to fit together with a scarf or overlapping joint—that is, the plane of contact is inclined. This is done by beveling one tip on the front and beveling the other on the rear.

A T-shaped catch 15 is cast with or attached to the last-mentioned beveled tip 13, with its head portion projecting beyond the end of the tip and its edges slanting downward and to the right, as shown in the drawings. A recess or socket 16, corresponding in shape to the catch 15, is formed in the other tip 13 and is adapted to receive said catch. The plane of the incline of the inner edge of catch 15 is parallel with the plane of the meeting surfaces of the tips 13, so that as the catch passes into the recess 16 these meeting surfaces rub together and remain in close contact after the engagement is made. When once seated in the recess 16, the catch is held therein by the tension of spring 4 and is locked therein by means of the bar 17, carried on the end of a spring 18, which is mounted within the shell of socket 14. This bar 17 is depressed by the catch on entering the recess and springs up into place as soon as the catch is seated, entering the space left vacant by reason of a cut-away portion on the end of the catch. When in this position, the bar 17 stands in the path of the catch 15 and prevents its removal from the recess 16; but by pressing a knob 19, projecting through a perforation in the shell of socket 14 and mounted on spring 18, the bar 17 is depressed out of the path of catch 15, and said catch is free to be removed.

To the exposed portions of members 1 on their front faces are secured the usual line-rings 20 and also the trace-hooks 21, which latter are provided with inwardly-projecting spurs 22, driven entirely through the members 1 and clenched at their ends before the covering 2 is applied. One of the spurs 22 of each trace-hook 21 carries the usual breast-ring 23.

In operation the collar in its open position, as shown in Fig. 1, is passed over the horse's neck and the ends of the members brought together with such a hinge-like, torsional, and rolling movement on the spring connection 4 as to seat the catch 15 in the recess 16, where it is automatically locked in position by the bar 17 in the manner previously described. When so brought together, the members are prevented from spreading apart at their upper ends beyond the extent desired by reason of the adjustable double-link connection 10. Whatever the vertical adjustment of spring 4 on the members 1 may be, the ends of spring 4 should never be permitted to tightly embrace the neck-pad 6, as it is an important feature of this invention that said neck-pad should always be free to oscillate upon its pivotal connection 7 to permit of its resting immovable on the horse's neck, while the collar proper is caused to swing first with one side foremost and then with the other side foremost incident to the natural movements of the horse's shoulders in walking.

The adoption of a spring as a connecting means for the upper ends of the collar members normally holds said collar members the proper distance apart at the bottom to allow the passage of the horse's neck therebetween and also permits the strong and rigid fastening means employed by reason of the hinge-like torsional and rolling actions necessary to seat the catch 15 within the slot 16. Once seated, the tension of spring 4 holds the catch within the slot and at the same time serves as a resilient support for the neck-pad.

With no restricting means against the separation of the upper ends of the collar members the adjustment of the spring 4 to a higher position to fit a larger size horse would have the tendency to spread the upper ends of the collar members farther apart than they should be, and so the links 10 are employed and are adapted to be adjusted either in their relation to each other or by being moved bodily to a higher or lower position on the collar members to permit of only the exact amount of spread of the collar members that is found desirable. A further use of links 10 is to prevent the collar from spreading in any case, as without them the wedge-like pressure of a horse's shoulders would soon draw out the curvature of spring connection.

The scarfed or overlapped joint of the collar members at their lower ends is principally for the purpose of avoiding all possibility of pinching the horse's skin therebetween, as would be the case were the joint made straight across, and, further, this form of joint coacts with the form of engaging means employed to produce a most rigid connection to withstand the stresses to which this part is subjected when in use.

The inclination of the edges of the catch to the right as said catch is shown in Fig. 2, together with the corresponding inclination of the walls of the recess, as also therein shown, are principally to give to these engaging members a claw grip which will only be tightened by any tendency to pull them directly apart. Here it may be observed that the spring connection 4 coöperates with this feature of the engaging means by permitting, through its torsional action, of their being thrown into different pivotal planes, which is necessary for the operation of this engaging means because of the inclinations just mentioned. Realizing the possibility of the engaging means becoming accidentally disconnected, due to a side pressure on one of the collar members, were this inclination alone relied upon, I have further provided the catch edges with a downward inclination and have formed the recess to correspond, and thus bring into play a rolling action of the spring 4 to permit of one collar member being raised higher than the other, as required by the last-mentioned inclination. By the combination of the two inclinations, necessitating an upward as well as an outward movement of the catch for its disengagement, together with the tension exerted by the spring connection at top of collar, the liability to an accidental release becomes extremely remote, and it may be practicable to rely on these alone without further locking means.

To the end that all possibility of accidental disengagement may be absolutely prevented I employ the spring-pressed bar 17 to positively lock the catch 15 in place, as before described, and when it is desired to remove the collar it is only necessary that the knob 19 be depressed to remove bar 17 from the path of the catch, when the members may be drawn apart.

The employment of the wooden base for the collar members having their lower ends incased in malleable castings so formed as to provide a strong and efficient fastening device without the addition of extra parts permits the construction of a desirable collar with less than one-half the leather now used in their manufacture, and as the wooden members are utilized as hames the expense of providing means for holding hames in proper position is also obviated. This results in simplifying the construction of a collar and greatly reducing the cost of its manufacture.

The bead 3 is provided to increase the bearing-surface where the collar engages the horse's neck and to avoid sharp edges, which would have a tendency to chafe the horse.

Having fully described my invention in detail, what I claim as new, and desire to secure by Letters Patent, is—

1. A horse-collar comprising members having an adjustable spring connection at their upper parts in combination with unyielding means also connecting the members at their upper parts and engaging means at the lower ends of the members.

2. A horse-collar comprising members having an adjustable spring connection at their upper parts with adjustable means connecting the members above the spring connection and engaging means at the lower ends of the members.

3. A horse-collar comprising members having a spring-top connection, a catch on the lower end of one member provided with an inner edge inclined laterally to the plane of radial movement of the members about said spring connection and the other member having in its lower end a correspondingly-shaped recess to receive the catch.

In testimony whereof I affix my signature in presence of two witnesses.

WM. C. LAWSON.

Witnesses:
   J. M. PHIPPS,
   E. C. EVERSOLE.